(12) United States Patent
Cardoso

(10) Patent No.: US 10,961,044 B2
(45) Date of Patent: Mar. 30, 2021

(54) BIODEGRADABLE PACKAGING FOR STORING EGGS

(71) Applicant: Erika Cezarini Cardoso, Botucatu/SP (BR)

(72) Inventor: Erika Cezarini Cardoso, Botucatu/SP (BR)

( * ) Notice: Subject to any disclaimer, the term of this patent is extended or adjusted under 35 U.S.C. 154(b) by 20 days.

(21) Appl. No.: 16/345,954

(22) PCT Filed: Oct. 26, 2017

(86) PCT No.: PCT/BR2017/050322
§ 371 (c)(1),
(2) Date: Apr. 29, 2019

(87) PCT Pub. No.: WO2018/076091
PCT Pub. Date: May 3, 2018

(65) Prior Publication Data
US 2020/0055663 A1  Feb. 20, 2020

(30) Foreign Application Priority Data
Oct. 31, 2016  (BR) .............................. 102016025507

(51) Int. Cl.
*B65D 85/32* (2006.01)
*B65D 1/36* (2006.01)
(Continued)

(52) U.S. Cl.
CPC ............. *B65D 85/322* (2013.01); *B65D 1/36* (2013.01); *B65D 21/0234* (2013.01); *B65D 65/466* (2013.01)

(58) Field of Classification Search
USPC .................. 206/521.1, 521.6, 521.7, 521.15; 220/508
See application file for complete search history.

(56) References Cited

U.S. PATENT DOCUMENTS 1,929,944 A * 10/1933 Chaplin ............... B65D 85/322
217/26.5
3,421,682 A * 1/1969 Eisenbach ............... B29C 51/32
206/502
(Continued)

FOREIGN PATENT DOCUMENTS

BR          0200787 A     7/2002
BR     PI 0200787-8       7/2002
(Continued)

OTHER PUBLICATIONS

International Search Report for PCT/BR2017/050322, filed Oct. 26, 2017.

*Primary Examiner* — Jacob K Ackun
(74) *Attorney, Agent, or Firm* — Schmeiser, Olsen & Watts, LLP

(57) ABSTRACT

A biodegradable packaging for storing eggs is provided and includes a package manufactured from the plastic transformation of a biodegradable composition, including at least one source of gelatinized starch, at least one source of powder starch and at least one natural fiber. The embodiments present a new design, improved ergonomics of handhold, high stacking capacity, improved mechanical resistance and moisture resistance over other biodegradable packages, besides high thermal insulation. After consumption of the eggs initially packaged in its interior, the embodiments may be reused as a plant's vase, as a complement to animal feed or as an organic compound.

12 Claims, 3 Drawing Sheets

(51) Int. Cl.
 *B65D 21/02* (2006.01)
 *B65D 65/46* (2006.01)

(56) References Cited

U.S. PATENT DOCUMENTS

| | | | |
|---|---|---|---|
| 3,664,574 A * | 5/1972 | Pearl et al. | B65D 85/324 |
| | | | 206/521.1 |
| 4,015,766 A * | 4/1977 | Petersen | B65D 85/324 |
| | | | 206/521.1 |
| 5,660,904 A * | 8/1997 | Andersen | C08L 1/28 |
| | | | 428/36.4 |
| 5,705,239 A * | 1/1998 | Andersen | B28B 23/0087 |
| | | | 428/34.5 |
| 7,258,234 B2 | 8/2007 | Aardema et al. | |
| 7,398,882 B2 * | 7/2008 | Barrett | B65D 1/30 |
| | | | 206/521.15 |
| 8,991,604 B2 * | 3/2015 | Buckley | B65D 85/32 |
| | | | 206/521.1 |
| 9,027,780 B2 | 5/2015 | Attard | |
| 2006/0060493 A1 * | 3/2006 | Marshall | B65D 75/24 |
| | | | 206/521.1 |
| 2006/0219594 A1 * | 10/2006 | Andrews | B65D 85/32 |
| | | | 206/521.8 |
| 2013/0264243 A1 * | 10/2013 | Aardema | B65D 85/32 |
| | | | 206/521.1 |

FOREIGN PATENT DOCUMENTS

| | | |
|---|---|---|
| BR | 0400842 A | 12/2004 |
| BR | PI 0400842 A | 12/2004 |
| CN | 206142164 U | 5/2017 |
| EP | 2862815 B1 | 3/1967 |
| EP | 2862815 A1 | 4/2015 |
| ES | 327519 A1 | 3/1967 |
| MU | 8900957-6 | 4/2010 |
| MU | 8900957 U2 | 4/2010 |

* cited by examiner

BIODEGRADABLE PACKAGING FOR STORING EGGS

CROSS-REFERENCE TO RELATED APPLICATIONS

This application claims priority to PCT Application No. PCT/BR2017/050322, having a filing date of Oct. 26, 2017, based on Brazilian Application No. BR 10 2016 025507-4, having a filing date of Oct. 31, 2016, the entire contents both of which are hereby incorporated by reference.

FIELD OF TECHNOLOGY

The following relates to packages manufactured from biodegradable compositions, designed to condition eggs in its interior. Its innovative design provides ergonomic handhold and allows a safe and practical stacking.

BACKGROUND

The state of the art teaches a wide variety of packages intended to condition fragile and brittle foodstuffs, such as eggs. However, all packaging available in the consumer market present relevant problems that have not yet been adequately solved.

Firstly, problems related to the raw materials used in manufacturing such packages are common. Plastic materials commonly used such as expanded polystyrene (EPS) and polyvinyl chloride (PVC) are difficult to recycle and they are not easily biodegradable. As biodegradable material is understood to be the one capable of being degraded through the action of microorganisms or other biological means. Other materials, such as recycled cardboard, offer low mechanical resistance, low moisture resistance, low thermal insulation, low quality finishing and high toxicity since they contain high concentration of heavy metals and favor the proliferation of pathogenic microorganisms, such as fecal coliforms. Frequently, pigments, inks and toxic dyes are used in the manufacture of packages, representing risks to public health.

Biodegradable packages are also described in the state of the art, as may be seen in patent applications PI 0200787-8 and PI 0400842-1. In these documents, compositions based on manioc starch, hereinafter referred to as manioc starch, binding agents, solvents and natural dyes are presented. However, such compositions are poorly mechanically resistant and exhibit low moisture resistance.

Another problem faced by the state of the art consists in inadequate ergonomics of the existing packaging on the market. Such packages are usually fully rectangular, designed with no concern regarding ergonomics optimization. Thus, referred packages present impaired handholds, favoring the risk of fallings and eventual breaking of stored eggs.

Examples of non-ergonomic rectangular packages are described in U.S. Pat. Nos. 7,258,234, and 9,027,780 and in the patent application of utility model MU 8900957-6.

U.S. Pat. No. 7,258,234 presents a conditioning package for eggs formed by transparent base and lid, both rectangular and connected with each other by a hinged portion. Disadvantageously, the referred package has been designed without any concern regarding stacking or the ergonomics of the handhold.

U.S. Pat. No. 9,027,780 presents a package to eggs condition and other foods formed by a base and a lid, both rectangular and connected with each other by a hinged portion. Disadvantageously, the referred package was designed without any concern regarding stacking or the ergonomics of the handhold.

Utility model patent application MU 8900957-6 teaches a conditioning eggs and other foods package formed by a base and lid, both rectangular and connected with each other by an articulated portion, sealed by ultrasound. Beyond the need of using additional equipment in its manufacturing, the package was designed without any concern regarding stacking or the ergonomics of the handhold.

As one can see, the state of the art would be favored by the introduction of an ergonomic biodegradable conditioning egg package with high stacking capacity, made from natural and abundant elements, presenting high mechanical resistance, being resistant to humidity and presenting high thermal insulation.

SUMMARY

An aspect relates to a container for the packaging of fragile and brittle foods, especially eggs, presenting innovating design, improved ergonomics and high stacking capacity.

Another aspect of embodiments of the present invention is to present an environmental-friendly package, manufactured from a biodegradable composition formed from abundant natural substances, such as starch, industrial waste, such as sugar-cane bagasse. Finally, another aspect of embodiments of the present invention is to provide an egg package that can be reused after its primary use as a plant's vase, complement to animal feed or as an organic compound.

The purposes of embodiments of the invention are achieved by the introduction of an essentially rectangular conditioning egg package formed by the fitting of equally sized lid and base, its design comprising a central region of smaller length as compared to the ends, which facilitates the handhold by the user.

The embodiments are manufactured from plastic transformation of a biodegradable composition comprising at least one source of gelatinized starch, at least one source of powder starch and at least one natural fiber. The plastic transformation process occurs through injection, pouring, thermoforming or compression.

The curing time of referred to process is comprised between 30 and 300 seconds, within a temperature range between 200 and 300° C.

After primary use, i.e., after consumption of the eggs originally displayed in the package, it can be reused as a plant's vase, complement to animal feed or as an organic compound.

BRIEF DESCRIPTION OF THE DRAWINGS

Some of the embodiments will be described in detail, with reference to the following figures, wherein like designations denote like members, wherein.

DETAILED DESCRIPTION

Figure 1:
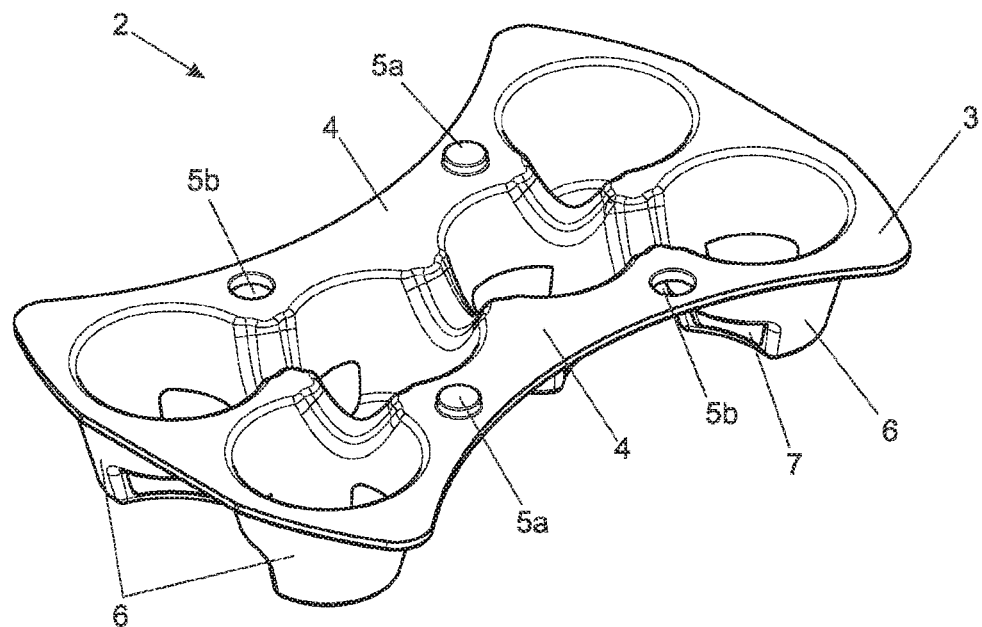
FIG. 1 presents a perspective view of the package's base.
Figure 2:
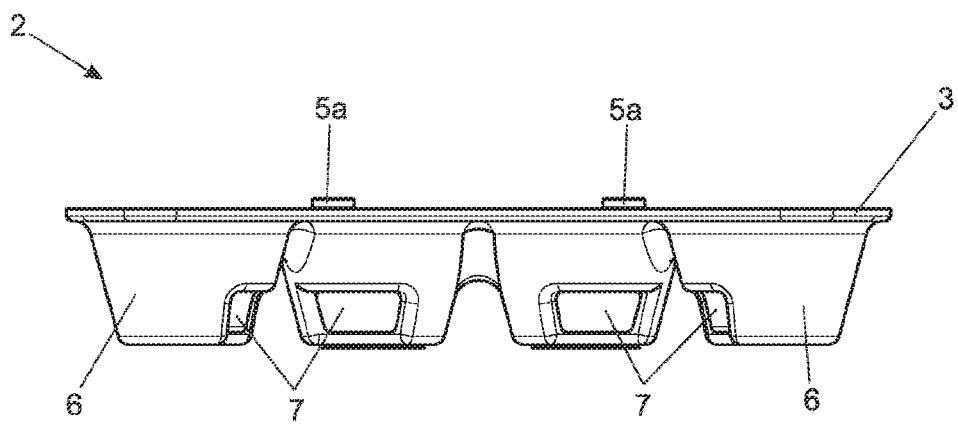
FIG. 2 presents a front view of the package's base.
Figure 3:
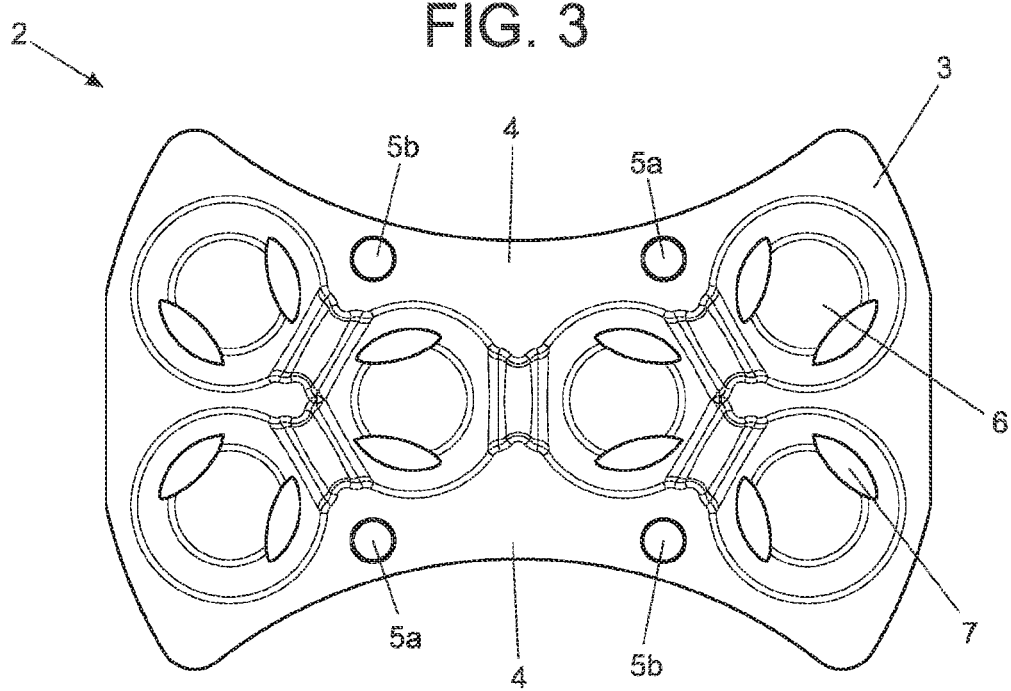
FIG. 3 presents a top view of the package's base.
Figure 4:
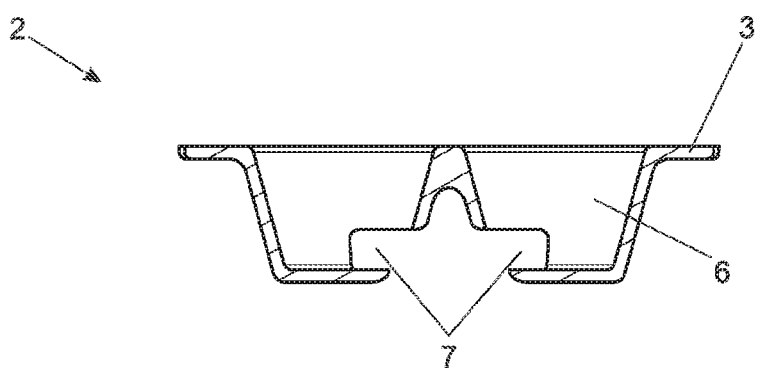
FIG. 4 presents a sectional view of the package's base.
Figure 5:
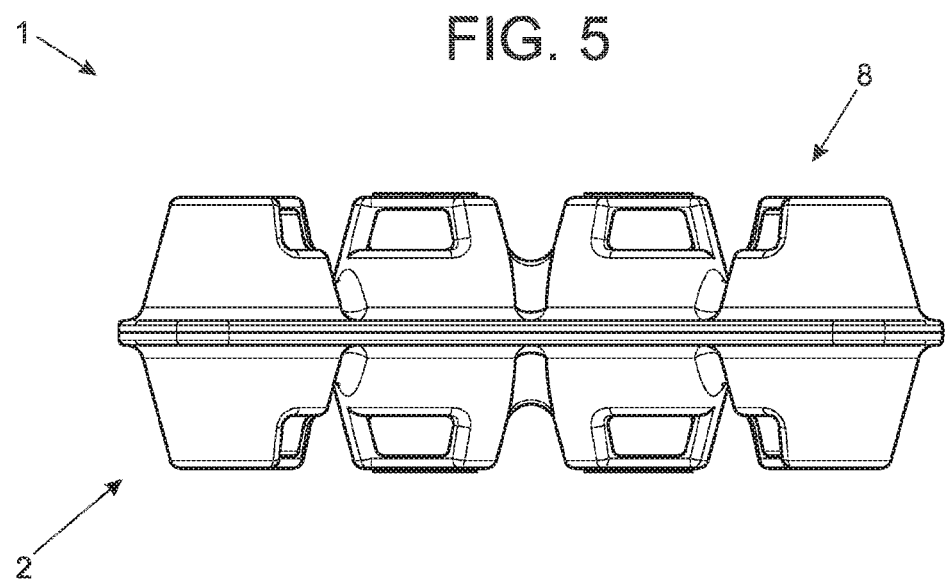
FIG. 5 presents a front view of the closed package.

According to the above-illustrated figures, embodiments of the present invention entitled "BIODEGRADABLE EGG CONDITIONING PACKAGE" was developed with the purpose of solving multiple problems currently faced by the state of the art.

The base (2) of the package (1) is formed by a massive body, presenting a substantially rectangular contouring laminar flap (3) with rounded corners. The front and posterior walls, of greater length, are convexly arched. The convexity of the front and posterior walls allows the shaping of a central region (4) of shorter length in relation to the ends. The lateral walls of the laminar flap (3), in the other hand, present a slightly curved shape presenting rectilinear central portion.

From the referred laminar flap (3), at least two engagements are projected in relief (5a) and at least two engagements in bore (5b), diametrically opposed, forming an "X" shaped fitting assembly. The referred engagements (5a, 5b) preferably present circular shape and match to each other.

Also, from this laminar flap (3), a plurality of interconnected trunk-like bodies (6) of circular base are projected, such trunk-like bodies being designed to pack the eggs. The number of trunk-like bodies (6) is preferably comprised between two and twelve. Each of these trunk-like bodies (6) may present rectangular openings (7), preferably diametrically opposite each other.

The lid (8) of the package (1) presents the same shape as the base (2). Therefore, the closed package (1) is comprised of the attachment of a lid (8) and a base (2), both in the same shape, fit with the aid of circular fittings in relief (5a) and in bores (5b).

The shorter central region (4) of the package, formed by the convexity of the front and posterior faces, provide to embodiments of the present invention easy handling and ergonomics when manually conveying thereof. In this sense, the risk of falls and eventual breakage of the packaged eggs inside it are considerably reduced.

The differentiated format of embodiments of the present invention enables a practical and safe stacking of a greater number of packages in relation to the state of the art, as attested by technical reports. In this process, the front and posterior walls of the laminar flap (3) of a closed package (1) conform themselves to the lateral walls of adjacent closed packages. Such characteristic represents a great advantage for both producers and shop owners, as it facilitates both transport and exposure of closed packages (1) containing eggs, besides making transportation and exposure practical and safer.

As previously described, the base (2) of the package (1) has the same shape as the lid (8). Consequently, the industrial production of the packages is more agile and less laborious with respect to similar articles, since the proper configuration of the equipment for manufacturing the lid (8) is the same for the manufacture of the bases (2).

The manufacturing process of embodiments of the present invention occurs by the plastic transformation by injection, pouring, thermoforming or compression of a biodegradable composition comprising at least one source of gelatinized starch, at least one source of powdered starch and at least one natural fiber.

The gelatinized starch source is preferably gelatinized manioc starch. Alternatively, maize starch, rice, potato, wheat, oats and rye may be used in the gelatinized form.

The source of powder starch is chosen from a group which comprises manioc starch, corn starch, rice starch, potato starch, wheat starch, oatmeal starch and rye starch.

The natural fiber is chosen from a group comprising sugarcane bagasse, coconut fiber, bamboo fiber, manioc peel, rice husk, wood fiber and other natural fiber sources, preferably proceeding from agro-industrial wastes, i.e., substances, products or materials produced in industrial or agricultural processes, which can still be reused.

The weight ratio between the gelatinized starch source and the powdered starch source comprises in the range of 1:1 to 1:2. Alternatively, natural dyes, food colorings, natural flavorings may be used in the composition. The biodegradable composition of embodiments of the present invention is non-toxic.

The curing process takes place in a temperature range comprised between 200 and 300° C. The corresponding curing time is comprised between 30 and 300 seconds, preferably between eighty and one hundred seconds.

The embodiments present superior mechanical strength, resistance to moisture and superior finishing comparing to the packages described in the stare of the art, especially the packages manufactured from cardboard or from biodegradable compositions. In addition, the package presented herein is non-toxic and offers high thermal insulation, assisting to preserve the eggs packed inside. Since the eggs are subject to lower temperature variations in embodiments of the present invention, the eggs have longer shelf life as compared to eggs stored in commonly found packages of the state of the art. Furthermore, the rectangular openings (7) enable the visual inspection of the conditioned eggs by consumers at the time of purchase.

Still, embodiments of the present invention present novelties as to its later use, i.e., after its primary use, characterized as the consumption of the eggs initially put therein. Its characteristic shape and its biodegradable composition make it possible to use it as a plant's vase after its primary use. In the referred later use, the base (2) or the lid (8) of the packages (1) are put up directly in the soil. Thus, the rectangular openings (7) of the trunk-like bodies (6) allow both the flow of water through the soil and the growth of the roots of the plants. Due to being biodegradable, the package (1) is naturally incorporated by the soil and does not harm the growth of plants.

Another further use for embodiments of the present invention is its use as a complement to animal feed or organic compound, due to its composition based on starch and natural fibers.

Although the invention has been illustrated and described in greater detail with reference to the preferred exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

The invention claimed is:

1. A biodegradable packaging for storing eggs, comprising:
   a base including:
      a body portion including a first end, a second end, and a central region disposed between the first end and the second end, the body portion defined by a laminar flap that has rounded corners and a width at the central region that is less than a width at both the first end and the second end such that the laminar flap curves inwardly on both sides of the body portion, between the first end and the second end;
      a plurality of egg holders protruding from the body portion and having a cavity configured to store an egg, each of the egg holders including a rectangular opening within a wall of the egg holder, wherein each rectangular opening is diametrically opposed to a neighboring rectangular opening of a neighboring egg holder;

at least two discrete protrusions formed on the laminar flap and diametrically opposed from each other;

at least two discrete detents formed on the laminar flap and diametrically opposed from each other; and a lid having a same shape as the base and configured to be placed onto the base to form the biodegradable packaging.

2. The biodegradable packaging for storing eggs according to claim 1, wherein the biodegradable packing is manufactured using a process selected from a group consisting of: injection, pouring, thermoforming, and compression.

3. The biodegradable packaging for storing eggs according to claim 1, wherein, when the lid is placed onto the case, at least two protrusions of the lid fit into the at least two detents on the base, and at least two detents of the lid receive the at least two protrusions of the base.

4. The biodegradable packaging for storing eggs according to claim 1, wherein the base and the lid are comprised of a biodegradable composition including at least one source of gelatinized starch, at least one source of powder starch, and at least one natural fiber.

5. The biodegradable packaging for storing eggs according to claim 1, wherein the biodegradable packing is cured within a temperature range between 200 and 300° C.

6. The biodegradable packaging for storing eggs according to claim 5, wherein a curing time is between 30 and 300 seconds.

7. The biodegradable packaging for storing eggs according to claim 4, wherein the gelatinized starch is chosen from a group consisting of: manioc starch, corn starch, rice starch, potato starch, wheat starch, oatmeal starch, and rye starch in a gelatinized form.

8. The biodegradable packaging for storing eggs according to claim 4, wherein the powder starch is chosen from a group consisting of: manioc starch, corn starch, rice starch, potato starch, wheat starch, oatmeal starch, and rye starch.

9. The biodegradable packaging for storing eggs according to claim 4, wherein a weight ratio between the gelatinized starch and the powder starch vary between 1:1 and 1:2.

10. The biodegradable packaging for storing eggs according to claim 4, wherein the natural fiber is chosen from a group consisting of: sugar-cane bagasse, coconut fiber, manioc peel, rice husk, and wood fibers, proceeding from agro-industrial waste.

11. The biodegradable packaging for storing eggs according to claim 1, wherein the plurality of egg holders include between two and twelve egg holders.

12. The biodegradable packaging for storing eggs according to claim 1, wherein the at least two detents and the at least two protrusions are circular.

* * * * *